No. 702,160. Patented June 10, 1902.
P. B. H. SEABROOK.
CLAMP PARTICULARLY ADAPTED FOR SECURING FITTINGS TO THE FRAMES OF CYCLES.
(Application filed Apr. 1, 1902.)
(No Model.) 2 Sheets—Sheet 1.
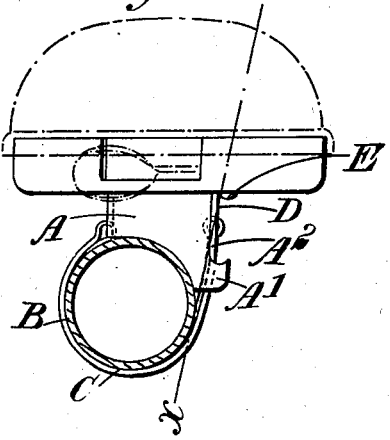
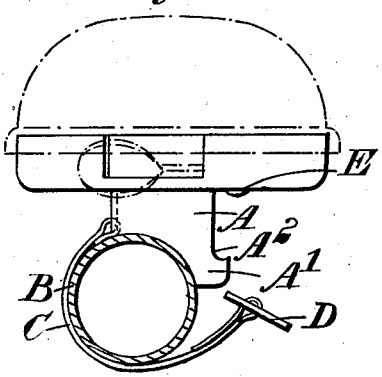
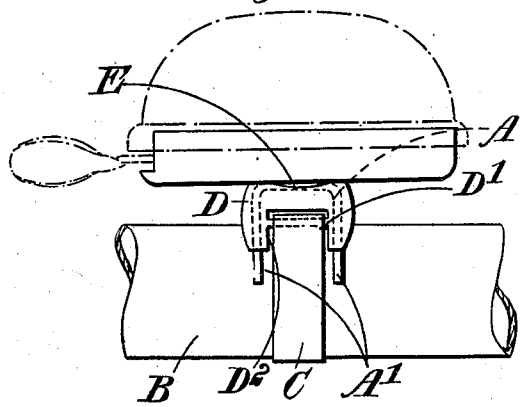
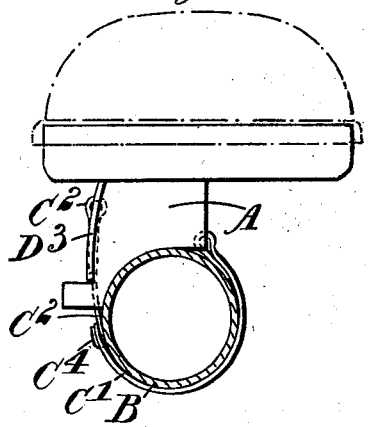

No. 702,160. Patented June 10, 1902.
P. B. H. SEABROOK.
CLAMP PARTICULARLY ADAPTED FOR SECURING FITTINGS TO THE FRAMES OF CYCLES.
(Application filed Apr. 1, 1902.)
(No Model.) 2 Sheets—Sheet 2.
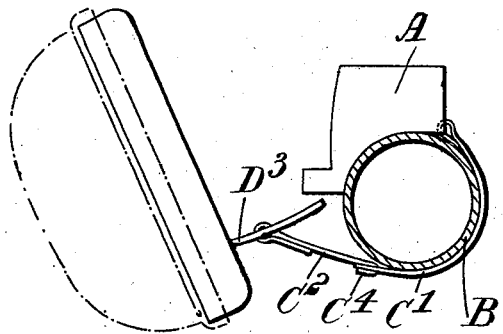
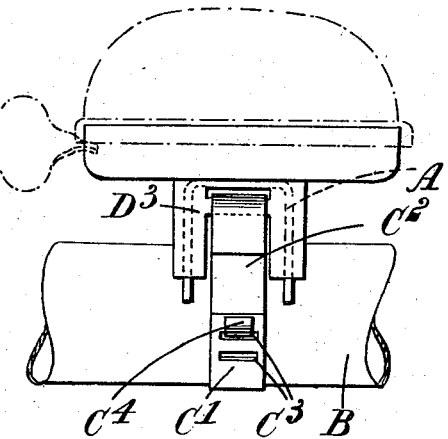
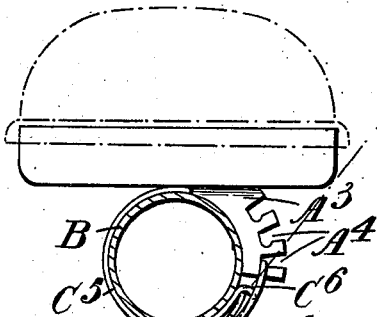
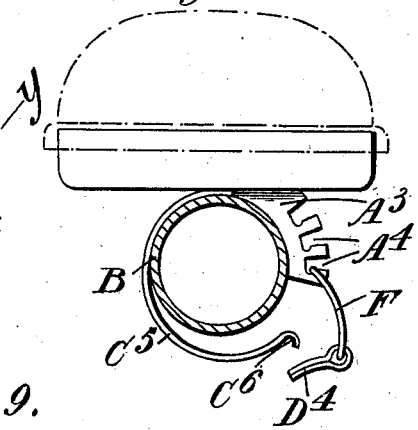
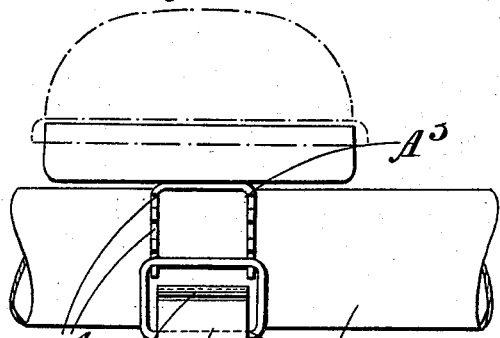

UNITED STATES PATENT OFFICE.

PERCY BENSON HARRISON SEABROOK, OF LONDON, ENGLAND.

CLAMP PARTICULARLY ADAPTED FOR SECURING FITTINGS TO THE FRAMES OF CYCLES.

SPECIFICATION forming part of Letters Patent No. 702,160, dated June 10, 1902.

Application filed April 1, 1902. Serial No. 101,008. (No model.)

*To all whom it may concern:*

Be it known that I, PERCY BENSON HARRISON SEABROOK, a subject of the King of England, residing at London, England, have invented a certain new and useful Improvement in Clamps Particularly Adapted for Securing Fittings to the Frame of a Cycle, of which the following is a specification.

This invention relates to clamps particularly adapted for securing fittings to the frame of a cycle, and has for its object to provide a device by which the bell, for instance, may be more readily secured to or detached from, say, the handle-bar of a bicycle than is possible by means of the forms of clamp at present in use for this purpose.

According to this invention the bell or other article is secured to the handle-bar or other support by means of a strap, such as is commonly employed for this purpose, and is usually made of metal. One end of the strap is fastened to a lug conveniently shaped to engage the support to which the clamp is to be secured, and its free end carries a lever adapted to operate against a fulcrum on the lug. When the strap is made to encircle the support to which the clamp is to be secured, the lever is placed in engagement with its fulcrum, upon which it is turned, so that the two ends of the strap are drawn together and the clamp tightly clasped upon the support. The fulcrum is so placed that the line of tension when the lever is in its operative position is made to pass between it and the support, so that the tension put upon the strap by the lever serves to retain the lever in its operative position.

In the accompanying drawings, Figure 1 is a side elevation of a clamp constructed according to one method of carrying out this invention, the clamp being shown in position upon its support. Fig. 2 is a similar view to Fig. 1, showing the clamp unfastened. Fig. 3 is a front view of the clamp as shown in Fig. 1. Figs. 4, 5, and 6 are similar views to Figs. 1, 2, and 3, but illustrating a modified construction of clamp; and Figs. 7, 8, and 9 are again similar views to Figs. 1, 2, and 3 of yet another modified construction of clamp.

Like letters indicate like parts throughout the drawings.

A U-shaped lug A, conveniently stamped up from sheet metal, is shaped to receive a support B, to which it is desired to secure the clamp. To one end of the lug, which end may conveniently be closed in, is secured one end of a metal strap C, and to the free end of the strap C is pivoted a lever D. In order that the lever D may be free to swing upon the end of the strap, a slot D' is provided in the lever, through which the end of the strap is passed, the end being then turned back upon the main body of the strap, to which, if desired, it may be secured by riveting or other means, and a recess $D^2$ is provided in the lower or operative end of the lever to permit the passage of the strap when fixing the clamp. The end of the lug remote from that end to which the strap is secured is conveniently left open, so that a jaw is formed adapted to receive the free end of the strap. On each side of the lug a projection A' is provided, placed approximately at right angles to the surface of the strap when the latter is made to encircle the support and serve as a fulcrum for the operative end of the lever D.

Any desired device may be secured to the clamp, conveniently to that part of the lug which forms the base of the U. In the drawings a bell is indicated in chain line as secured to this part of the lug; but obviously the lug may be variously shaped or a special lug may be secured to the strap, if desired, to carry the bell or any other device to be secured to the support.

To secure the clamp to its support, the lug is placed in position upon the support so that the curved part of the lug corresponds to the curvature of the support. The strap is then carried around the support, and the operative end of the lever—that is, that end in which the slot $D^2$ is provided—is made to rest upon the projections A'. The lever is then turned upon the fulcrum, so that tension is put upon the strap C and securely binds the latter upon the support B. To prevent the return of the lever D and the consequent slacking of the strap C, the fulcrum A' is thrown out from the support by providing a shoulder $A^2$ on each of the projections A', which maintains the base of the lever D at such a distance from the support that when brought home to the position shown in Figs. 1 and 3 the line of tension between the ends of the strap, of which of course the lug A is considered a part, falls between the fulcrum of the lever D and the support, as shown in dotted lines at X X. To render the lever more secure when in its operative position, its free end is brought over to the left of a vertical line passing through the fulcrum, so that the tension of the strap will tend to cause the lever to be carried still farther in this direction. To limit the movement of the lever D in this direction, the shoulder $A^2$ may be continued to the top of the lug and carried back out of the vertical line, so that it forms a stop for the lever by which the latter is maintained in the desired position. To still further insure against the lever D being accidentally moved in a direction to release the clamp, a projection E may be provided on the under side of the bell or other article secured to the lug A. The projection may be of sufficient proportions to engage the lever as it is driven home against the lug, and the material upon which the projection is formed must of course be sufficiently resilient to permit the passage of the lever.

Any convenient device may be provided for adjusting the length of the strap C so that the clamp may be fitted to supports of various sizes. In Figs. 4 to 6 the strap is shown as formed in two parts $C'$ $C^2$, respectively. The part $C'$ is secured by one end to the lug A, as before, and its free end is provided with two or more orifices $C^3$, placed at varying distances from the extreme end. The part $C^2$ is provided at one end with a hook $C^4$, adapted to engage any one of the orifices $C^3$ in the part $C'$, and its free end carries a lever $D^3$, similar to the lever D in Figs. 1, 2, and 3. By engaging one or other of the orifices $C^3$ of the part $C'$ with the hook $C^4$ of the part $C^2$ the length of the strap may be adjusted, as will be readily understood. The lever $D^3$ is shown in the drawings as curved instead of straight, as in the case of the lever D, although it may be made straight, if desired.

The bell or other article is shown as secured to the lever, Fig. 5, and this acts as a means by which the lever may be handled for the purpose of operating it.

Figs. 7 to 9 illustrate a modified construction of fastening-lever and a modified device for adjusting the length of the strap. The fastening-lever $D^4$ is in this case pivoted to a wire loop or link F, pivoted in turn to the lug $A^3$. The strap $C^5$ is secured at one end to the lug $A^3$, as before, and its free end is provided with a hook or projection $C^6$, adapted to engage the free end of the lever $D^4$. To apply the clamp constructed according to this last method, the free end of the lever $D^4$ is brought against the under side of the projection $C^6$ on the strap $C^5$, and the link F being free to swing upon the lug $A^3$ is pressed toward the support, so that the parts take the position shown in Fig. 7. In this position the line of tension is made to lie, as before, between the fulcrum—that is, that part of the projection $C^6$ against which the free end of the lever $D^4$ bears—and the support D, this being brought about by either curving the link F, as shown in the drawings, or, if desired, by placing the fulcrum farther from the face of the support by any convenient means, such as thickening that part of the strap or providing a shoulder on the projection similar to the shoulder $A^2$ on the projections $A'$. It will be seen in Fig. 7 that the line of tension between the parts to which the ends of the link F are attached does not actually fall between the fulcrum and the support B, but passes through the fulcrum, as shown at Y Y. When the parts, however, are in this position, the tension of the strap maintains them in place, although it is preferable that the position of the parts should be such as to cause the tension of the strap to tend more directly to pull the lever toward the support. In the construction of device shown in these figures the adjustment of the strap $C^5$ is effected by means of notches $A^4$ in the lug $A^3$. The notches $A^4$ are placed at varying distances from the end of the lug, so that the loop F may be placed in one or other pair of notches, thus lengthening or shortening the strap.

It will be noticed that in the construction of clamp last described the lug $A^3$ and strap $C^5$ are shown as stamped up in one piece, although, if preferred, they may be made in two separate parts, as in the case of the two forms of clamps first described. Obviously the lug A and strap C or $C'$ may be stamped up in one piece similarly to the lug $A^3$ and strap $C^5$.

What I claim as my invention, and desire to secure by Letters Patent, is—

1. In a clamp the combination of a strap adapted to encircle a support, means to permit the overlapping of the ends of the strap without their lying one upon the other, a projection on one end of the strap, a lever pivoted to the other end and adapted to operate against the projection as a fulcrum so that tension is put upon the strap, means for turning the lever upon its fulcrum, means for retaining the lever in its operative position and means for securing an article to the clamp substantially as set forth.

2. In a clamp the combination of a strap adapted to encircle a support, means to permit the overlapping of the ends of the strap without their lying one upon the other, a projection on one end of the strap, a lever pivoted to the other end and adapted to operate against the projection as a fulcrum so that tension is put upon the strap, means for turning the lever upon its fulcrum, a stop against which the lever is brought by the tension put on the strap and means for securing an article to the clamp substantially as set forth.

3. In a clamp the combination of a strap adapted to encircle a support, means to permit the overlapping of the ends of the strap without their lying one upon the other, a projection on one end of the strap, a lever pivoted to the other end and adapted to operate against the projection as a fulcrum so that tension is put upon the strap, means for positioning the base of the fulcrum so that the line of tension passes between it and the support clasped by the clamp, means for turning the lever upon its fulcrum, a stop to limit the movement of the lever in one direction and means for securing an article to the clamp substantially as set forth.

4. In a clamp the combination of a strap adapted to encircle a support, a forked end to the strap adapted to receive the other end, a projection on one end of the strap, a lever pivoted to the other end and adapted to operate against the projection as a fulcrum so that tension is put upon the strap, means for positioning the base of the fulcrum so that the line of tension passes between it and the support clasped by the clamp, means for turning the lever about its fulcrum, a stop to limit the movement of the lever in one direction and means for securing an article to the clamp substantially as set forth.

5. In a clamp the combination of a strap adapted to encircle a support, a lug on one end of the strap and forming a continuation of it, a jaw on the lug to receive the free end of the strap, a projection on each end of the jaw approximately at right angles to the face of the free end of the strap, a lever pivoted to the free end of the strap and adapted to operate against the projections as a fulcrum so that tension is put upon the ends of the strap, a shoulder on the projections so positioned that the line of tension is made to pass between the fulcrum and the support clasped by the clamp, a recess in the lever to permit the passage of the strap when fixing the clamp, means for turning the lever upon its fulcrum, a stop to limit the movement of the lever in one direction and means for securing an article to the clamp substantially as set forth.

6. In a clamp the combination of a strap adapted to encircle a support, a lug on one end of the strap and forming a continuation of it, a jaw on the lug to receive the free end of the strap, a projection on each end of the jaw approximately at right angles to the face of the free end of the strap, a lever pivoted to the free end of the strap and adapted to operate against the projections as a fulcrum so that tension is put upon the ends of the strap, a shoulder on the projection so positioned that the line of tension is made to pass between the fulcrum and the support clasped by the clamp, a recess in the lever to permit the passage of the strap when fixing the clamp, an article secured to the lever of the clamp and a stop to limit the movement of the clamp in one direction substantially as set forth.

In testimony whereof I have signed my name to this specification in the presence of two subscribing witnesses.

PERCY BENSON HARRISON SEABROOK.

Witnesses:
W. J. DOSSETTER,
A. M. HAYWARD.